US012346700B2

(12) United States Patent
Shaked et al.

(10) Patent No.: US 12,346,700 B2
(45) Date of Patent: Jul. 1, 2025

(54) TECHNIQUES FOR MOUNTING DISKS IN AN INSPECTION ENVIRONMENT

(71) Applicant: Wiz, Inc., New York, NY (US)

(72) Inventors: Yaniv Shaked, Tel Aviv (IL); Roy Reznik, Tel Aviv (IL)

(73) Assignee: Wiz, Inc, New York, NY (US)

( * ) Notice: Subject to any disclaimer, the term of this patent is extended or adjusted under 35 U.S.C. 154(b) by 91 days.

(21) Appl. No.: 18/303,944

(22) Filed: Apr. 20, 2023

(65) Prior Publication Data

US 2024/0354118 A1 Oct. 24, 2024

(51) Int. Cl.
*G06F 9/4401* (2018.01)

(52) U.S. Cl.
CPC ............ *G06F 9/4411* (2013.01); *G06F 9/441* (2013.01)

(58) Field of Classification Search
None
See application file for complete search history.

(56) References Cited

U.S. PATENT DOCUMENTS

| | | | |
|---|---|---|---|
| 8,943,355 B2 | 1/2015 | Hsu et al. | |
| 9,128,626 B2 | 9/2015 | Chacko | |
| 9,451,023 B2 | 9/2016 | Sancheti et al. | |
| 9,946,559 B1 * | 4/2018 | Naftel | G06F 11/1448 |
| 10,715,314 B2 | 7/2020 | Gauda | |
| 10,776,329 B2 | 9/2020 | Rao et al. | |
| 10,996,974 B2 | 5/2021 | Dornemann et al. | |
| 11,294,768 B2 | 4/2022 | Rana | |
| 2012/0079474 A1 * | 3/2012 | Gold | G06F 8/63 717/173 |
| 2022/0398047 A1 | 12/2022 | Tewari | |

FOREIGN PATENT DOCUMENTS

CN 110795155 A 2/2020

OTHER PUBLICATIONS

International Search Report, Israel Patent Office, Jerusalem, Israel.
Written Opinion of the International Searching Authority, Israel Patent Office, Jerusalem, Israel.

* cited by examiner

*Primary Examiner* — Fahmida Rahman
(74) *Attorney, Agent, or Firm* — M&B IP Analysts, LLC

(57) ABSTRACT

A system and method for assembling a disk for cybersecurity inspection is disclosed. The method includes receiving access to an inspectable disk, the inspectable disk including a block device and a list of partitions; mounting a first partition from the list of partitions at a first directory in response to detecting a first operating system on the first partition; detecting a boot directory on a second partition from the list of partitions in response to detecting a second operating system on the second partition; detecting a mounting partition from a configuration file of the detected boot directory; detecting a filesystem table on the mounting partition; and mounting each partition from the list of partitions based on an order indicated by the filesystem table.

17 Claims, 7 Drawing Sheets

TECHNIQUES FOR MOUNTING DISKS IN AN INSPECTION ENVIRONMENT

TECHNICAL FIELD

The present disclosure relates generally to cybersecurity, and specifically to techniques for mounting inspectable disks in a cloud computing environment.

BACKGROUND

Cybersecurity threats are diverse as are the computing environments in which they are encountered. As a result, cybersecurity monitoring solutions, such as cybersecurity scanners, are required to operate in multiple different computing environments, such as networked environments, on-prem environments, cloud computing environments, hybrid environments, combinations thereof, and the like.

Adding to this complication, each computing environment can include resources, such as virtual machines, bare metal machines, software containers, serverless functions, and the like, which are implemented differently based on the computing environment. For example, a Microsoft® Windows® based machine can be deployed as a bare metal machine in an on-prem environment, in a Microsoft® Azure cloud computing environment, on a virtual machine such as Oracle® VirtualBox® deployed in an Amazon® Web Services cloud computing environment, and the like.

Each of these instances is susceptible to cybersecurity threats, and as such requires scanning, inspection, and the like, in order to discover cybersecurity threats, exposures, vulnerabilities, and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for assembling a disk for cybersecurity inspection. The method also includes receiving access to an inspectable disk, the inspectable disk including a block device and a list of partitions; mounting a first partition from the list of partitions at a first directory in response to detecting a first operating system on the first partition, detecting a boot directory on a second partition from the list of partitions in response to detecting a second operating system on the second partition, detecting a mounting partition from a configuration file of the detected boot directory, detecting a filesystem table on the mounting partition, and mounting each partition from the list of partitions based on an order indicated by the filesystem table. Other embodiments of this aspect include corresponding computer systems, apparatus, and computer programs recorded on one or more computer storage devices, each configured to perform the actions of the methods.

Implementations may include one or more of the following features. The method may include: determining that a partition which is first in a list of partitions in the configuration file is the mounting partition. The method may include: initiating inspection of a mounted partition for a cybersecurity object. The inspectable disk includes a plurality of logical volumes associated with a volume group; deactivating the volume group; changing a name of the volume group to a new volume group name, including a new universally unique identifier for each logical volume of the plurality of logical volumes; activating the volume group having the new volume group name; and mounting each logical volume as a partition from the list of partitions. The method may include: removing a group of logical volumes of the plurality of logical volumes, such that the volume group includes only a single logical volume. The method may include: parsing the filesystem table to detect a plurality of data fields, each data field including a data value. The plurality of data fields includes any one of: a universally unique identifier (uuid), a mount point, a file system type, a list of options, a backup operation, a file system check order, and any combination thereof. The method may include: mounting each partition in the list of partitions based on the filesystem table; detecting a timestamp at a predetermined location on each mounted partition; and selecting a partition for booting based on the detected timestamp. The method may include: initiating inspection of the selected partition for a cybersecurity object. Implementations of the described techniques may include hardware, a method or process, or computer software on a computer-accessible medium.

One general aspect includes a non-transitory computer readable medium having stored thereon instructions for causing a processing circuitry to execute a process. The non-transitory computer readable medium also includes receiving access to an inspectable disk, the inspectable disk including a block device and a list of partitions; mounting a first partition from the list of partitions at a first directory in response to detecting a first operating system on the first partition, detecting a boot directory on a second partition from the list of partitions in response to detecting a second operating system on the second partition, detecting a mounting partition from a configuration file of the detected boot directory, detecting a filesystem table on the mounting partition, and mounting each partition from the list of partitions based on an order indicated by the filesystem table. Other embodiments of this aspect include corresponding computer systems, apparatus, and computer programs recorded on one or more computer storage devices, each configured to perform the actions of the methods.

One general aspect includes a system for assembling a disk for cybersecurity inspection. The system also includes a processing circuitry. The system also includes a memory, the memory containing instructions that, when executed by the processing circuitry, configure the system to: receive access to an inspectable disk, the inspectable disk including a block device and a list of partitions; mount a first partition from the list of partitions at a first directory in response to detecting a first operating system on the first partition; detect a boot directory on a second partition from the list of partitions in response to detecting a second operating system on the second partition; detect a mounting partition from a configuration file of the detected boot directory; detect a filesystem table on the mounting partition; and mounting each partition from the list of partitions based on an order indicated by the filesystem table. Other embodiments of this aspect include corresponding computer systems, apparatus, and computer programs recorded on one or more computer storage devices, each configured to perform the actions of the methods.

Implementations may include one or more of the following features. The system where the memory further includes instructions which when executed by the processing circuitry configure the system to: determine that a partition which is first in a list of partitions in the configuration file is the mounting partition. The memory further includes instructions which when executed by the processing circuitry configure the system to: initiate inspection of a mounted partition for a cybersecurity object. The memory further includes instructions which when executed by the processing circuitry configure the system to: detect a logical volume manager associated with the inspectable disk, where the inspectable disk includes a plurality of logical volumes associated with a volume group; deactivate the volume group; change a name of the volume group to a new volume group name, including a new universally unique identifier for each logical volume of the plurality of logical volumes; activate the volume group having the new volume group name; and mount each logical volume as a partition from the list of partitions. The memory further includes instructions which when executed by the processing circuitry configure the system to: remove a group of logical volumes of the plurality of logical volumes, such that the volume group includes only a single logical volume. The memory further includes instructions which when executed by the processing circuitry configure the system to: parse the filesystem table to detect a plurality of data fields, each data field including a data value. The plurality of data fields includes any one of: a universally unique identifier (uuid), a mount point, a file system type, a list of options, a backup operation, a file system check order, and any combination thereof. The memory further includes instructions which when executed by the processing circuitry configure the system to: mount each partition in the list of partitions based on the filesystem table; detect a timestamp at a predetermined location on each mounted partition; and select a partition for booting based on the detected timestamp. The memory further includes instructions which when executed by the processing circuitry configure the system to: initiate inspection of the selected partition for a cybersecurity object. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
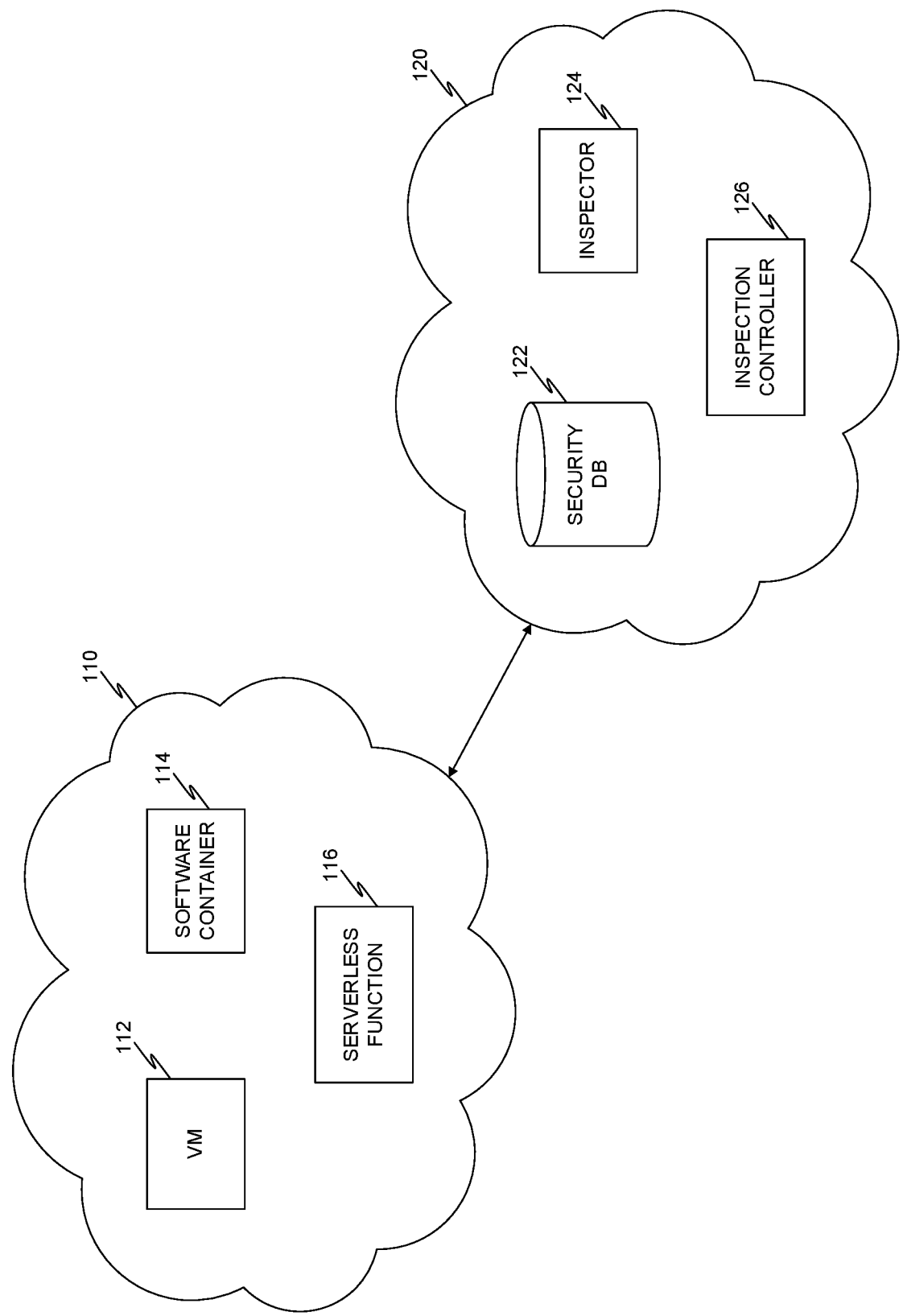
FIG. 1 is an example of a network diagram of a computing environment and an inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for mounting partitions for performing cybersecurity inspection. In an embodiment, an inspectable disk is generated based off of a disk in production environment. In an embodiment, the inspectable disk is mounted at a mounting point. In some embodiments, a system, such as an inspection controller is configured to select an inspectable disk from a plurality of disks. In certain embodiments, an order in which disks are mounted affects the ability to mount the disk.

For example, in an embodiment, mounting a disk incorrectly results in an inability to read the disk by the inspector. In certain embodiments, the inspection controller is configured to detect an operating system of the disk. In some embodiments, the inspection controller is configured to detect a logical volume manager, a volume group, a combination thereof, and the like.

FIG. 1 is an example of a network diagram of a computing environment and an inspection environment, utilized to describe an embodiment. In certain embodiments, a computing environment 110 includes a plurality of resources, principals, and the like. In an embodiment, a resource is a physical machine, a virtual resource, a combination thereof, and the like. In an embodiment, a resource is a provisionable hardware, software application, and the like.

In certain embodiment, a principal is an entity which is authorized to initiate actions in the computing environment 110, such as a user account, a service account, a role, and the like. In some embodiments, a principal is an entity which is authorized, for example by a security policy, to initiate an action with respect to a resource, i.e., act on a resource.

In some embodiments, the computing environment 110 is a cloud computing environment, deployed on a cloud computing infrastructure. For example, according to an embodiment, a cloud computing infrastructure is Amazon® Web Services (AWS), Google® Cloud Platform (GCP), Microsoft® Azure, and the like. In some embodiments, the cloud computing environment is a virtual private cloud (VPC), a virtual network (VNet), and the like.

For example, in an embodiment, the computing environment 110 is implemented as a cloud computing environment including a plurality of resources, such as a virtual machine 112, a software container 114, a serverless function 116, a combination thereof, and the like.

In some embodiments, a virtual machine 112 is implemented as Oracle® VirtualBox. In certain embodiments, a software container 114 is implemented using a Kubernetes® platform, a Docker® Engine, and the like. In some embodiments, a serverless function 116 is an Amazon® Lambda function. In certain embodiments, the resources of the computing environment 110 access a storage, such as a block storage, a bucket, and the like. In some embodiments, a resource, such as the virtual machine 112 is provisioned storage which is addressable by the virtual machine 112 as a disk. A provisioned storage scheme is discussed in more detail below in FIG. 2.

In an embodiment, an inspection environment is configured to inspect a computing environment 110 for cybersecurity objects, cybersecurity threats, a combination thereof, and the like. For example, in certain embodiments, a cybersecurity object is a hash of a file, a certificate, a password, a code object, an operating system, a software application, a combination thereof, and the like. In some embodiments, a cybersecurity threat is a misconfiguration, a vulnerability, an exposure, a combination thereof, and the like.

In some embodiments, the inspection environment 120 is implemented as a cloud computing environment, and access is provided, for example by establishing a network link, between the inspection environment 120 and the computing environment 110.

In an embodiment, the inspection environment 120 includes a security database 122, an inspector 124, an inspection controller 126. In some embodiments, a security database 122 is implemented as Neo4j®, on which a security graph is stored. In an embodiment, the security graph includes a representation of the computing environment 110. For example, in some embodiments, the security graph represents entities of the computing environment 110 as nodes in the security graph.

For example, in some embodiments, a security graph includes a data schema, according to which the security database is configured to store the representation. For example, in an embodiment, the data schema includes a first template for generating a node representing a resource, a second template for generating a node representing a principal, a third template for generating a node representing an enrichment, and the like.

In an embodiment, an inspector 124 is configured to detect a cybersecurity object, a cybersecurity threat, a combination thereof, and the like.

In certain embodiments, the inspector 124 is configured to detect a weak password, a cleartext password, a certificate, a file, a folder, a code object, a malware object, a misconfiguration, an exposure, a vulnerability, a combination thereof, and the like. In an embodiment, an inspector 124 is configured to access an inspectable disk and inspect the inspectable disk for a cybersecurity object.

In some embodiments, an inspection controller 126 is configured to determine which resources in the computing environment should be inspected, by which inspector, at what time, and the like. In certain embodiments, the inspection controller 126 is configured to determine that a disk in the computing environment 110 should be inspected.

In an embodiment, the inspection controller 126 is configured to generate an inspectable disk from a disk of the computing environment 110. In some embodiments, generating an inspectable disk includes generating a snapshot of the disk, a clone of the disk, a copy of the disk, and the like.

In certain embodiments, the inspection controller 126 is configured to mount the inspectable disk to the inspector 124. In an embodiment, the inspectable disk is mounted at a mounting point. In some embodiments, the inspection controller 126 is configured to select an inspectable disk from a plurality of disks. In certain embodiments, an order in which disks are mounted affects the ability to mount the disk.

For example, in an embodiment, mounting a disk incorrectly results in an inability to read the disk by the inspector. In certain embodiments, the inspection controller 126 is configured to detect an operating system of the disk. In some embodiments, the inspection controller 126 is configured to detect a logical volume manager, a volume group, a combination thereof, and the like.

Figure 2:
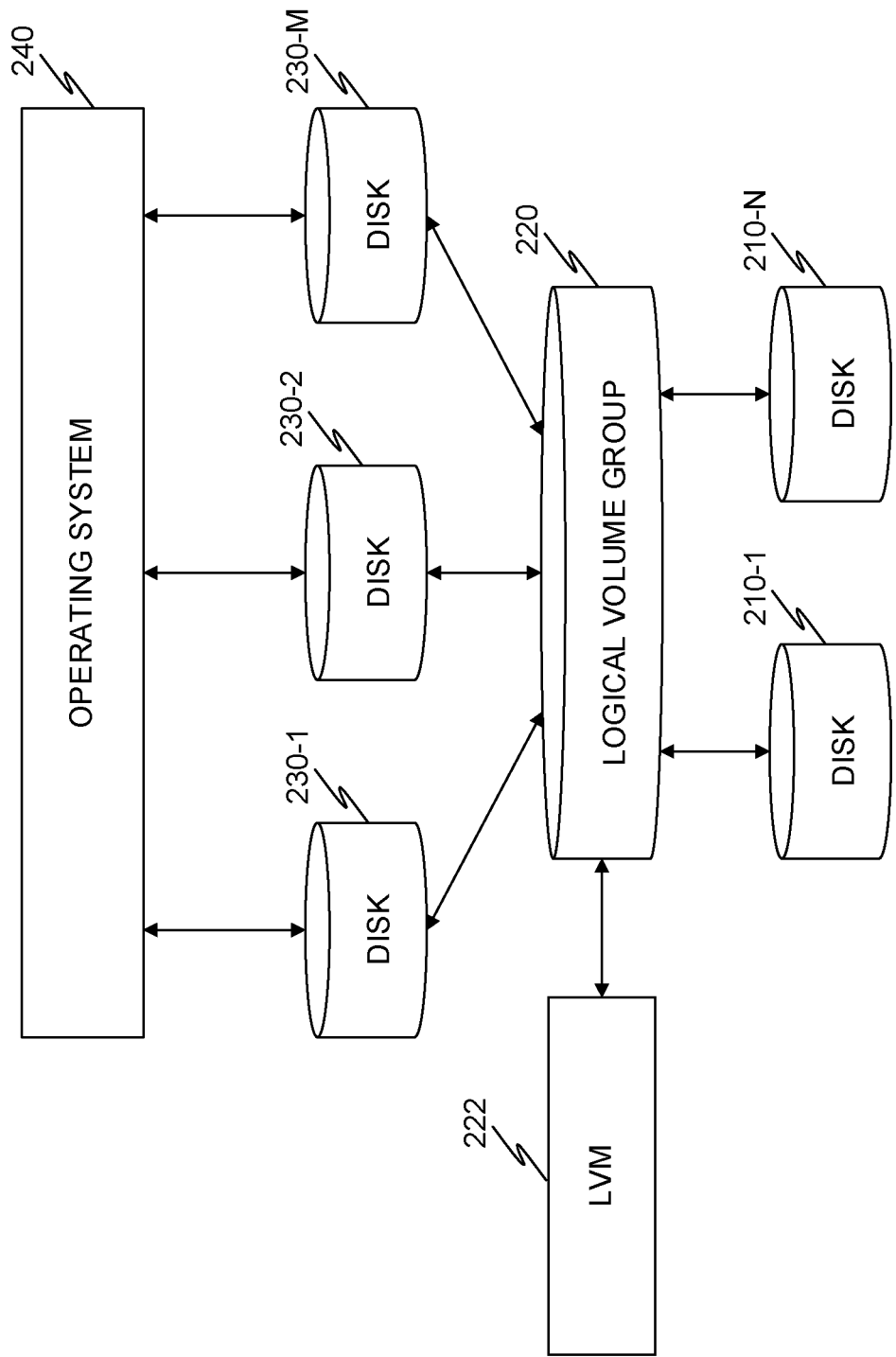
FIG. 2 is an example diagram of a physical to logical mapping of disks in a cloud computing environment, utilized to describe an embodiment.

FIG. 2 is an example diagram of a physical to logical mapping of disks in a cloud computing environment, utilized to describe an embodiment. In an embodiment, a logical volume includes a plurality of physical volumes, such as disks 210-1 through 210-N, where 'N' is an integer having a value of '2' or greater, referred to individually as disk 210, or collectively as disks 210. In some embodiments, a physical volume is initialized using a logical volume manager (LVM) architecture. In an embodiment, utilizing an LVM architecture is advantageous. For example, in an embodiment, an LVM architecture does not require that all storage space is allocated (or provisioned) to a specific disk, partition, and the like. Rather, as demand is there, unallocated portions of storage can be allocated to the partition, disk, and the like, which requires additional storage.

In certain embodiments, a physical volume is a hard disk drive, a solid-state drive, an optical medium storage, a partition, and the like. In some embodiments, a first group of disks are disks of a first type (e.g., hard disk drives), and a second group of disks are disks of a second type (e.g., solid-state drives).

In an embodiment, a volume group (VG) 220 is a consolidated storage, having the capacity of the total of the plurality of disks 210. For example, where the plurality of disks includes five disks each having a capacity of 2 Gb, and two disks having each a capacity of 10 Gb, the total size for the VG 220 is 30 Gb.

In an embodiment, the volume group 220 is utilized to generate a plurality of logical volumes 230-1 through 230-M, where 'M' is an integer having a value of '1' or greater, individually referenced as logical volume 230, and collectively as logical volumes 230. In certain embodiments, a first logical volume 230-1 is provisioned a first plurality of data blocks, corresponding to 1 Gb of storage. In some embodiments, a second logical volume 230-2 is provisioned a second plurality of data blocks, corresponding to 5 Gb of storage.

In some embodiments, a logical volume manager (LVM) 222 is configured to generate the volume group 220, based on the plurality of disks 210 which are initialized utilizing an LVM architecture. In certain embodiments, the LVM 222 is implemented as a software, firmware, combination thereof, and the like, and is further configured to communicate with an operating system 240. For example, in an embodiment, the operating system 240 is a Linux-type operating system, such as Ubuntu®.

Figure 3A:
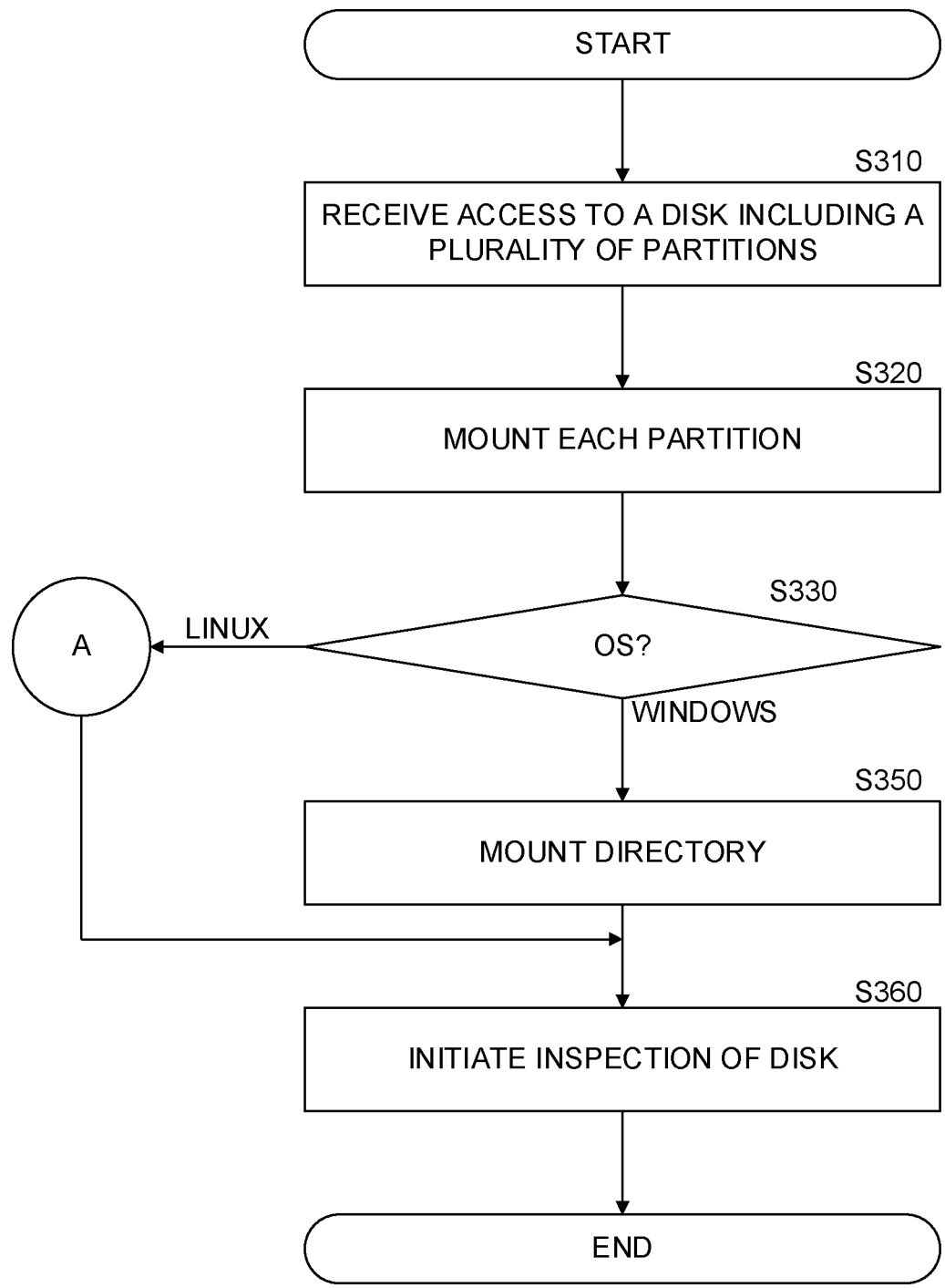
FIG. 3A is an example flowchart of a method for determining a disk mounting method, implemented in accordance with an embodiment.

FIG. 3A is an example flowchart of a method for determining a disk mounting method, implemented in accordance with an embodiment.

At S310, access is provided to a disk. In an embodiment, the disk is a disk associated with a resource, such as a virtual machine, a software container, a serverless function, and the like, deployed in a computing environment. In some embodiments, the disk is an inspectable disk, generated based on a disk deployed in a computing environment.

For example, in some embodiments, an inspectable disk is generated by generating a snapshot of a disk, generating a clone of a disk, generating a copy of a disk, a combination thereof, and the like. In an embodiment, in order to inspect the disk, for example by an inspector configured to detect a cybersecurity object, a disk needs to be mounted to a resource accessible to the inspector, such as a virtual machine. In an embodiment, a cybersecurity object is a file, a file type, a folder, a code object, a password, a certificate, a combination thereof, and the like.

In some embodiments, the disk includes a plurality of partitions. In an embodiment, a disk partition is a logical allocation of a portion of storage blocks of a physical disk. A physical disk has one or more partitions, according to an embodiment.

At S320, mounting of a partition is initiated. In an embodiment, each partition of a plurality of partitions are mounted. For example, in an embodiment, a mounting point is determined for each partition, and the partition is mounted at the mounting point. In certain embodiments, a list of partitions associated with a block device are received.

In an embodiment, mounting a partition includes associating the partition with an operating system of a specific resource, such as a virtual machine, and includes accessing directories, folders, system files, and the like, which are utilized to provide access to data stored on the block device on which the partition is defined.

At S330, a check is performed to detect an operating system. In an embodiment, a partition includes a Windows® operating system, a Linux® operating system, and the like. In some embodiments, detecting an operating system includes checking if a partition includes a "/Windows" directory. In certain embodiments, detecting an operating system includes checking if the partition includes a "/etc" directory.

In an embodiment, where a Windows® operating system is detected, execution continues execution continues at S350. For example, in an embodiment, where a "/Windows" directory is detected it is determined that a Windows® type operating system is detected. A Windows® type operating system is, for example, Windows® 11, Windows® 10, Windows® 8, Windows® NT, and the like.

Figure 3B:
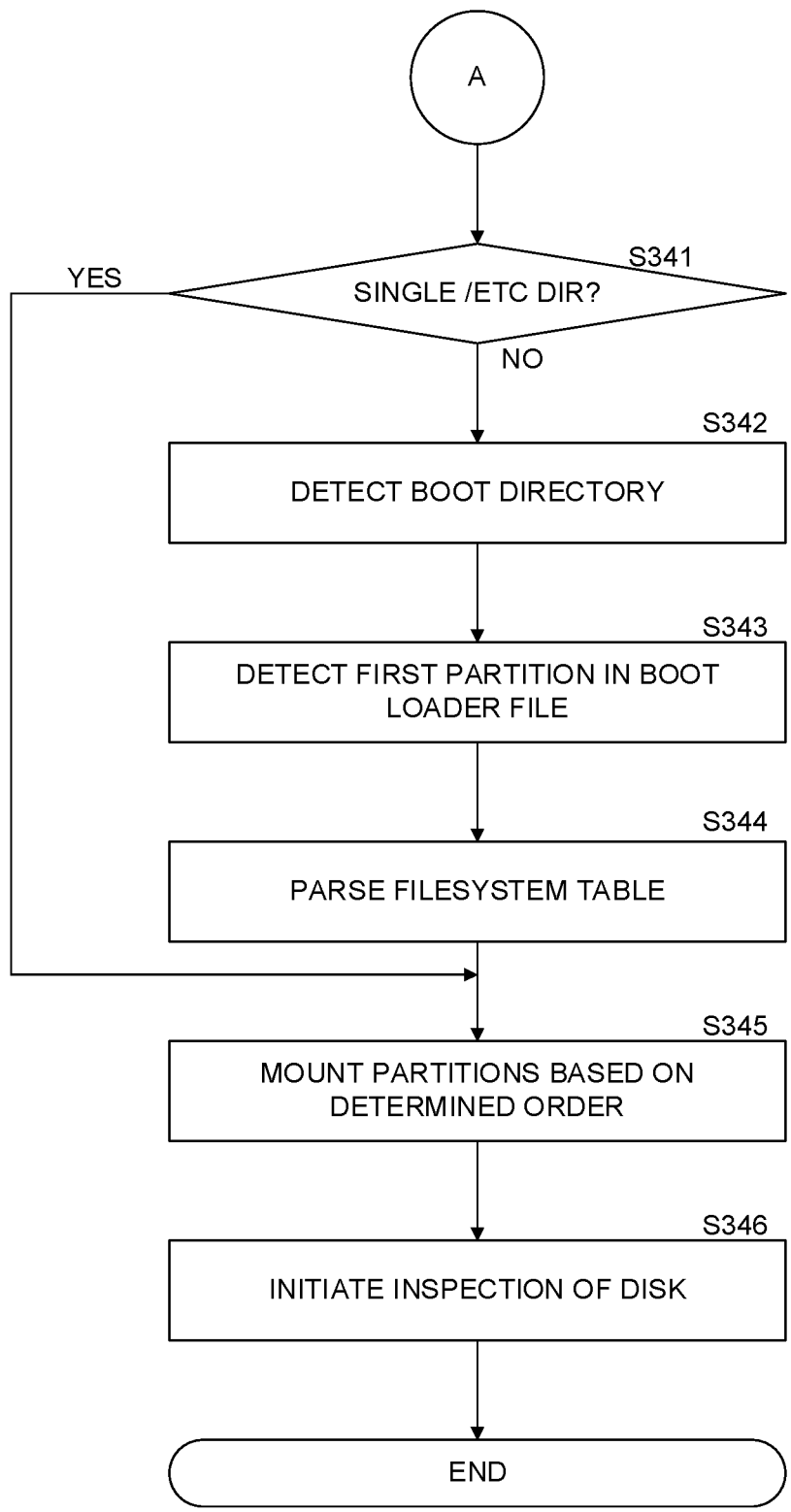
FIG. 3B is an example flowchart of a method for mounting a disk in a Linux-based computing environment, implemented according to an embodiment.

In an embodiment, where a Linux® operating system is detected, execution continues at S341, discussed in more detail in FIG. 3B. For example, in an embodiment where a "/etc" directory is detected it is determined that a Linux® type operating system is detected. A Linux® type operating system is, for example, Ubuntu®, Debian®, ChromeOS®, and the like.

At S350, the partition is mounted at the directory. In an embodiment, the partition includes the "/Windows" directory, a "/win" directory, and the like. In an embodiment, where there are a plurality of partitions, the partition with the "/windows" directory is mounted prior to the remaining partitions of the plurality of partitions.

In some embodiments, the partition is mounted to a virtual machine, software container, a serverless function, a combination thereof, and the like, at the detected directory. In certain embodiments, the virtual machine, for example, is configured to deploy an inspector. For example, in an embodiment, the inspector is deployed as a software application configured to detect a cybersecurity object on a disk, for example by reading a filesystem, detecting a file, detecting a folder, detecting a code object, and the like.

At S360, inspection is initiated. In an embodiment, inspection is initiated for each partition of a plurality of partitions, which are mounted so that the partition which includes the operating system, system files, combination thereof, and the like, is mounted as the first partition.

In certain embodiments, initiating inspection includes generating a persistent volume claim between the mounted partition and a workload configured to inspect the mounted partition for a cybersecurity object, a cybersecurity risk, a combination thereof, and the like.

FIG. 3B is an example flowchart of a method for mounting a disk in a Linux-based computing environment, implemented according to an embodiment. In an embodiment, mounting a disk in a Linux-based computing environment is performed in response to detecting a "/etc" directory on a block storage including a list of partitions. In some embodiments, a list of partitions includes a single partition.

At S341, a check is performed to detect if a single "/etc" directory is detected. In some embodiments, where a plurality of "/etc" directories are detected, this is an indication that a plurality of operating systems are installed on the disk. In an embodiment, where a plurality of directories are detected, execution continues at S342. In certain embodiments, where a single "/etc" directory is detected, execution continues at S345.

At S342, a boot directory is detected. In an embodiment, a single "/boot/" directory is detected on a partition which includes an "/etc" directory. In some embodiments, a boot directory is indicative of where a configuration file of a boot loader is stored. Such a file is accessed, for example, by a basic input/output system (BIOS) of a computing system, in order to determine what kernels should be initialized, in what order should kernels be initialized, and so on.

For example, according to an embodiment, a "grub.conf", "grub.cfg", and the like, is a configuration file utilized by a GRUB, an acronym for Grand Unified Bootloader. In some embodiments, GRUB supports multiple Linux kernels, each of which may be selected by a user at boot time of the machine, for example by providing an input to a menu generated by the GRUB. In other embodiments, another configuration file type is utilized by a similarly operating bootloader.

At S343, a first partition is detected in a boot loader file. In an embodiment, a GRUB configuration file is parsed to detect a first partition. For example, in an embodiment, a first partition corresponds to a first kernel of a Linux machine, and is marked as "partition 0". A second partition is marked as "partition 1", and so on, according to an embodiment.

In an embodiment, the first partition includes a filesystem table. For example, in certain embodiments, the filesystem table is a configuration table which includes an order in which file systems are mounted, unmounted, and the like, on a Linux machine. In an embodiment, the filesystem table is stored as an "fstab" in the "/etc" directory. In some embodiments, an "fstab" exists in each "/etc" directory, therefore it is advantageous to detect the partition which is mounted first based on the bootloader configuration file, and access the partition which is indicated as being mounted first to detect thereon the "fstab" file, table, and the like.

At S344, a filesystem table is parsed. In an embodiment, parsing a filesystem table includes reading a table, and detecting data fields and corresponding data values. For example, in an embodiment, an fstab table includes a plurality of columns (i.e., data fields), corresponding to a universally unique identifier (UUID), a mount point, a file system type, a list of options, a backup operation, a file system check order, a combination thereof, and the like.

At S345, a partition is mounted. In an embodiment, a plurality of partitions are mounted. In certain embodiments, each partition of the plurality of partitions is mounted in an order, and at a directory, as indicated in the filesystem table (e.g., the fstab).

At S346, inspection is initiated. In an embodiment, inspection is initiated for each mounted partition. In some embodiments, inspection is initiated for the first mounted partition. In certain embodiments, execution of S346 corresponds to execution of S360 of FIG. 3A above.

Figure 3C:
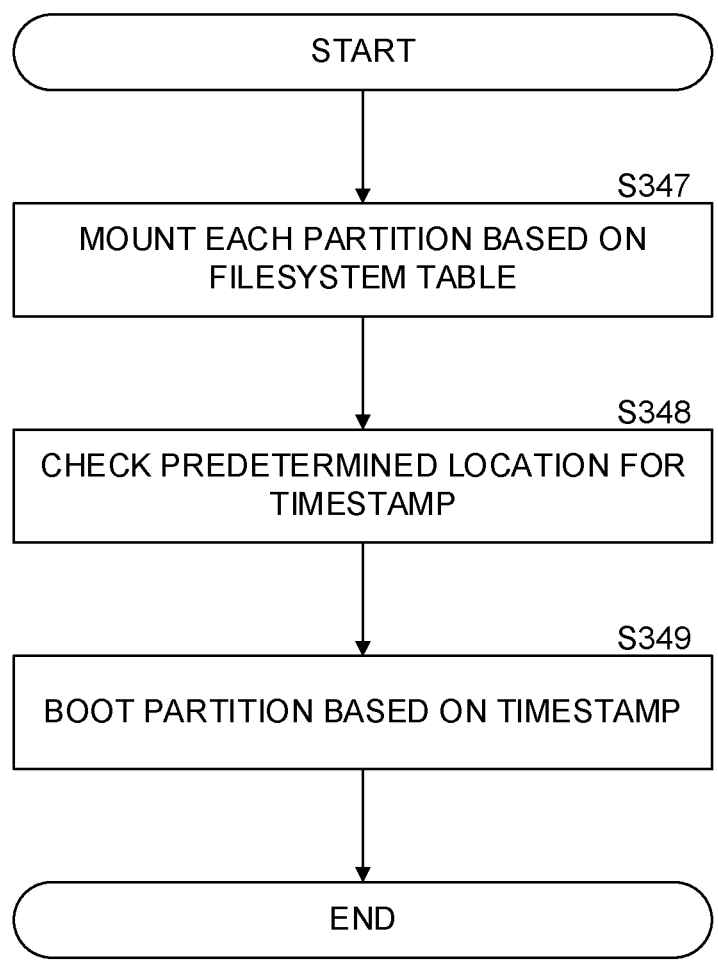
FIG. 3C is an example flowchart of an alternative method for mounting a disk in a Linux-based computing environment, implemented according to an embodiment.

FIG. 3C is an example flowchart of an alternative method for mounting a disk in a Linux-based computing environment, implemented according to an embodiment. In an embodiment, mounting a disk in a Linux-based computing environment is performed in response to detecting a "/etc" directory on a block storage including a list of partitions. In some embodiments, a list of partitions includes a single partition.

At S347, a plurality of partitions are mounted. In an embodiment, each partition of the plurality of partitions are mounted based on a filesystem table (FSTAB). In some embodiments, each partition of the plurality of partitions is associated with a different Linux-based machine.

At S348, a predetermined location is checked for a timestamp. In an embodiment, the predetermined location is a location in each of the mounted partitions. For example, in an embodiment, the location is a "/var/log" directory, so that the "/var/log" directory of each partition is checked for a timestamp.

In certain embodiments, the timestamp is a timestamp which indicates generation of a new file, modification of an existing file, modification of a user permission, generation of a user permission, access of the directory, a combination thereof, and the like.

In some embodiments, a plurality of locations are checked for a timestamp. For example, in an embodiment, a first location and a second location are each checked for a first partition, and a corresponding first location is checked for a second partition.

At S349, a partition is selected based on the detected timestamp. In an embodiment, the partition is selected based on the most recent timestamp detected. For example, in an embodiment, a first timestamp is detected in a first location of a first partition, and a second timestamp is detected at a second location of a second partition, such that the second timestamp is more recent (i.e., closer to the present time) than the first timestamp. Therefore, the second partition is selected. In some embodiments, the second location corresponds to the first location. In certain embodiments, the second location is a location which does not correspond to the first location.

In some embodiments, the selected partition is booted for inspection. In certain embodiments, the selected partition alone is inspected, for example as detailed above.

Figure 4:
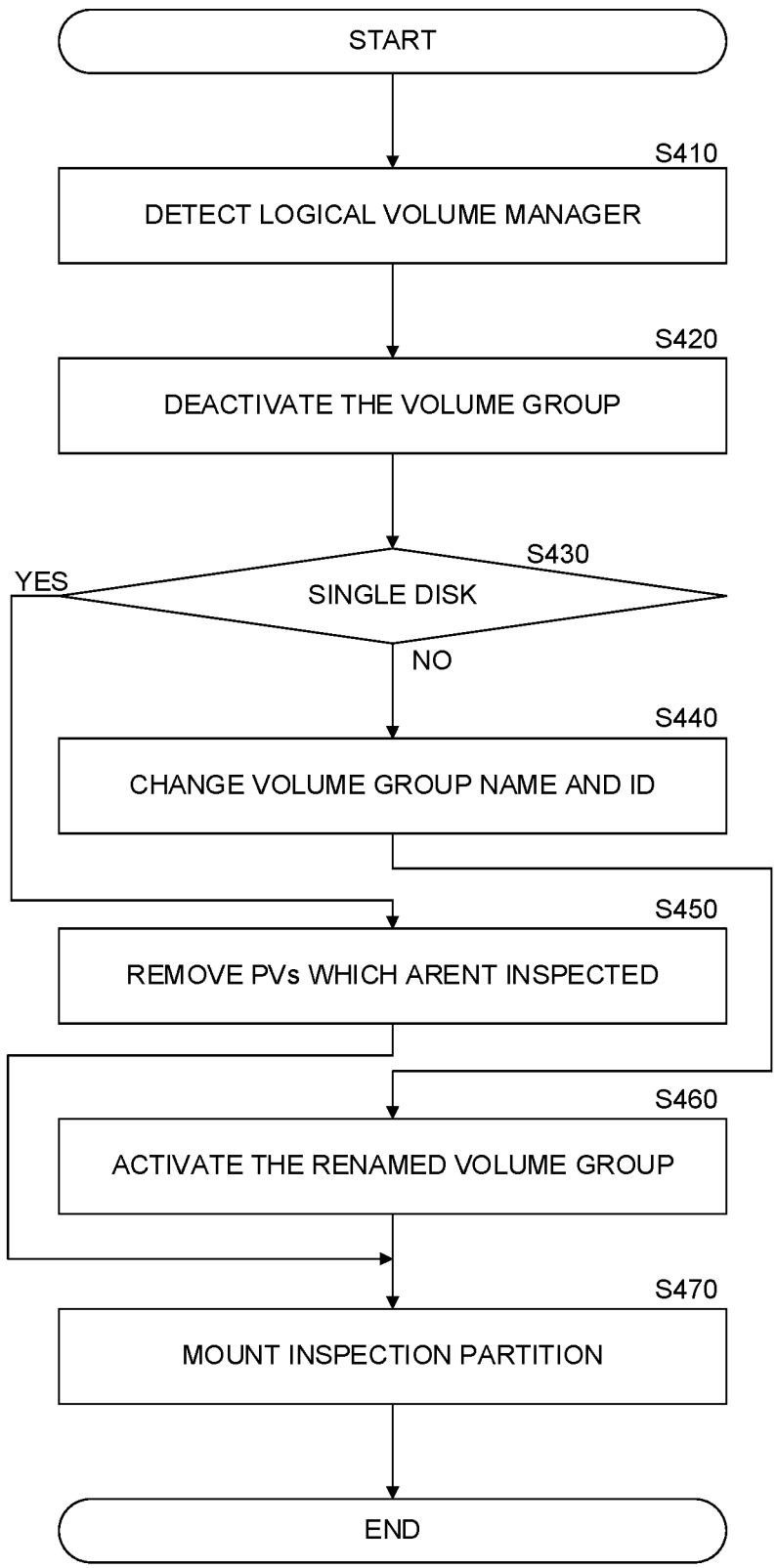
FIG. 4 is an example flowchart of a method for mounting a disk with a logical volume manager, implemented in accordance with an embodiment.

FIG. 4 is an example flowchart of a method for mounting a disk with a logical volume manager, implemented in accordance with an embodiment. In some embodiments, a machine utilizes a logical volume manager (LVM) architecture. An example of such an architecture and the advantages thereof are discussed in more detail in FIG. 2 above. In such embodiments, a plurality of LVM disks share a virtual group (VG) name, share a universally unique identifier (UUID), and the like, for example due to utilizing a single image to deploy a plurality of instances.

At S410, a logical volume manager is detected. In an embodiment, an LVM architecture is detected on a disk, on machine associated with a disk, a combination thereof, and the like. In some embodiments, detecting an LVM disk includes detecting a format of the disk. In certain embodiments, detecting an LVM disk includes detecting a "/dev/mapper" directory. In an embodiment, detecting an LVM further includes detecting an identifier of a volume group, detecting a UUID of a disk, a combination thereof, and the like.

At S420, the volume group is deactivated. In an embodiment, deactivating a volume group is performed by initiating a "vgchange" command in a Linux command line. For example, in certain embodiment, a command "vgchange -an --select pv_uuid=<pv_uuid>" is initiated, where "<pv_uuid>" corresponds to the UUID of the disk.

At S430, a check is performed to determine if a single disk is inspected. For example, in some embodiments, a single disk is inspected for a cybersecurity object, where only a disk containing an operating system, a filesystem, and the like, is inspected. This can be performed, according to an embodiment, to conserve inspection resources. In some embodiments, a machine includes a plurality of disks. In such embodiments, a single disk (e.g., a disk containing thereon the operating system) is inspected at a first time, and a plurality of disks are inspected at a second time, thus conserving inspection resources by inspecting certain disks according to a predetermined schedule.

In an embodiment, where a single disk is inspected, execution continues at S450. In some embodiments, where a plurality of disks are inspected, execution continues at S440.

At S440, the volume group name is changed. In an embodiment, changing a volume group name includes changing the volume group name and changing the UUID. In certain embodiments, changing a volume group name includes initiating a command "vgimportclone/disk/location-n<new-vg-name>", where "<new-vg-name>" corresponds to a new name of the volume group, which is different from the previously detected name of the volume group.

At S450, an uninspected volume is removed from the volume group. In certain embodiments, where a single disk is inspected, volumes which are not inspected (i.e., uninspected volumes) are removed from the volume group. For example, in an embodiment, removing a volume includes initiating a command "vgreduce—removemising—force <vgName>", where "<vgName>" is the name of the volume group.

At S460, the volume group is activated. In an embodiment, where the volume group is renamed, the renamed volume group is activated. In some embodiments, activating a volume group includes initiating a command "vhchange-ay<new-vg-name>", where "<new-vg-name>" corresponds to the new name of the volume group.

In some embodiments, execution continues at S341 of FIG. 3B above. For example, in an embodiment, once the volume group is activated, execution continues to detect a filesystem table (fstab) on a volume of the volume group which is to be inspected.

At S470, inspection is initiated. In an embodiment, inspection is initiated at S360 of FIG. 3A above. In an embodiment, inspection is initiated for each partition of a plurality of partitions, which are mounted so that the partition which includes the operating system, system files, combination thereof, and the like, is mounted as the first partition.

In certain embodiments, initiating inspection includes generating a persistent volume claim between the mounted partition and a workload configured to inspect the mounted partition for a cybersecurity object, a cybersecurity risk, a combination thereof, and the like.

Figure 5:
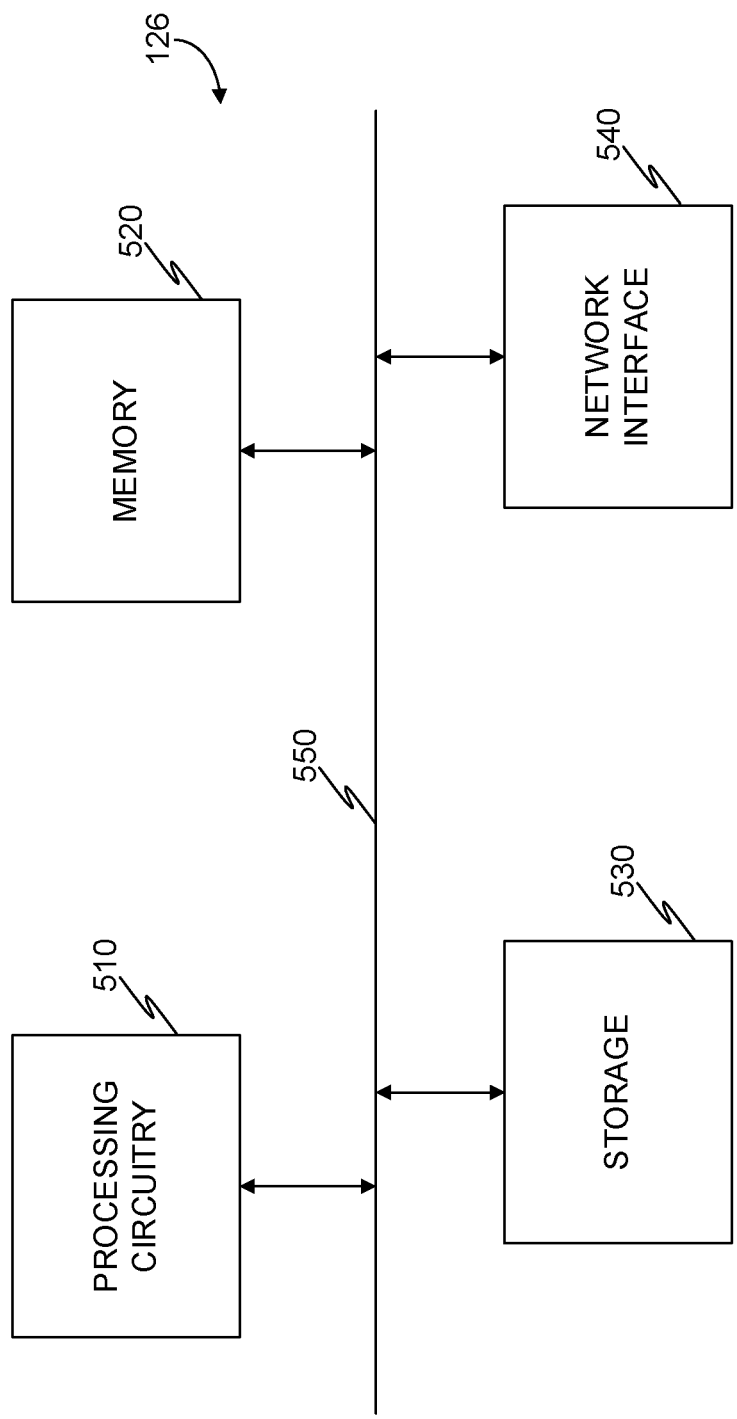
FIG. 5 is an example schematic diagram of an inspection controller according to an embodiment.

FIG. 5 is an example schematic diagram of an inspection controller 126 according to an embodiment. The inspection controller 126 includes a processing circuitry 510 coupled to a memory 520, a storage 530, and a network interface 540. In an embodiment, the components of the inspection controller 126 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the inspection controller 126 with communication with, for example, the inspector 124, the security database 122, and the like.

It should be understood that the embodiments described herein are not limited to the specific architecture illustrated in FIG. 5, and other architectures may be equally used without departing from the scope of the disclosed embodiments.

Furthermore, in certain embodiments the inspector 124 may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for assembling a disk for cybersecurity inspection, comprising:
    receiving access to an inspectable disk, the inspectable disk including a block device and a list of partitions;
    detecting a first operating system on a first partition from the list of partitions;

mounting the first partition from the list of partitions at a first directory in response to detecting the first operating system on the first partition;
detecting a second operating system on a second partition from the list of partitions;
detecting a boot directory on the second partition from the list of partitions in response to detecting the second operating system on the second partition;
detecting a mounting partition from a configuration file of the detected boot directory;
detecting a filesystem table on the mounting partition;
mounting each partition from the list of partitions based on an order indicated by the filesystem table;
detecting a timestamp at a predetermined location on each of the mounted partitions; and
selecting a partition for booting based on the detected timestamp.

2. The method of claim 1, further comprising:
determining that a partition which is first in a list of partitions in the configuration file is the mounting partition.

3. The method of claim 1, further comprising:
initiating inspection of a mounted partition for a cybersecurity object.

4. The method of claim 1, further comprising:
detecting a logical volume manager associated with the inspectable disk, wherein the inspectable disk includes a plurality of logical volumes associated with a volume group;
deactivating the volume group;
changing a name of the volume group to a new volume group name, including a new universally unique identifier for each logical volume of the plurality of logical volumes;
activating the volume group having the new volume group name; and
mounting each of the logical volumes as a partition from the list of partitions.

5. The method of claim 4, further comprising:
removing a group of logical volumes of the plurality of logical volumes, such that the volume group includes only a single logical volume.

6. The method of claim 1, further comprising:
parsing the filesystem table to detect a plurality of data fields, each data field including a data value.

7. The method of claim 6, wherein the plurality of data fields includes any one of: a universally unique identifier (UUID), a mount point, a file system type, a list of options, a backup operation, a file system check order, and any combination thereof.

8. The method of claim 1, further comprising:
initiating inspection of the selected partition for a cybersecurity object.

9. A non-transitory computer readable medium having stored thereon instructions for causing a processing circuitry to execute a process, the process comprising:
receiving access to an inspectable disk, the inspectable disk including a block device and a list of partitions;
detecting a first operating system on a first partition from the list of partitions;
mounting the first partition from the list of partitions at a first directory in response to detecting the first operating system on the first partition;
detecting a second operating system on a second partition from the list of partitions;
detecting a boot directory on the second partition from the list of partitions in response to detecting the second operating system on the second partition;
detecting a mounting partition from a configuration file of the detected boot directory;
detecting a filesystem table on the mounting partition;
mounting each partition from the list of partitions based on an order indicated by the filesystem table;
detecting a timestamp at a predetermined location on each of the mounted partitions; and
selecting a partition for booting based on the detected timestamp.

10. A system for assembling a disk for cybersecurity inspection, comprising:
a processing circuitry; and
a memory, the memory containing instructions that, when executed by the processing circuitry, configure the system to:
receive access to an inspectable disk, the inspectable disk including a block device and a list of partitions;
detect a first operating system on a first partition from the list of partitions;
mount the first partition from the list of partitions at a first directory in response to detecting the first operating system on the first partition;
detecting a second operating system on a second partition from the list of partitions;
detect a boot directory on the second partition from the list of partitions in response to detecting the second operating system on the second partition;
detect a mounting partition from a configuration file of the detected boot directory;
detect a filesystem table on the mounting partition;
mount each of the partitions from the list of partitions based on an order indicated by the filesystem table;
detect a timestamp at a predetermined location on each mounted partition; and
select a partition for booting based on the detected timestamp.

11. The system of claim 10, wherein the memory further includes instructions which when executed by the processing circuitry configure the system to:
determine that a partition which is first in a list of partitions in the configuration file is the mounting partition.

12. The system of claim 10, wherein the memory further includes instructions which when executed by the processing circuitry configure the system to:
initiate inspection of a mounted partition for a cybersecurity object.

13. The system of claim 10, wherein the memory further includes instructions which when executed by the processing circuitry configure the system to:
detect a logical volume manager associated with the inspectable disk, wherein the inspectable disk includes a plurality of logical volumes associated with a volume group;
deactivate the volume group;
change a name of the volume group to a new volume group name, including a new universally unique identifier for each logical volume of the plurality of logical volumes;
activate the volume group having the new volume group name; and
mount each of the logical volumes as a partition from the list of partitions.

14. The system of claim 13, wherein the memory further includes instructions which when executed by the processing circuitry configure the system to:
- remove a group of logical volumes of the plurality of logical volumes, such that the volume group includes only a single logical volume.

15. The system of claim 10, wherein the memory further includes instructions which when executed by the processing circuitry configure the system to:
- parse the filesystem table to detect a plurality of data fields, each data field including a data value.

16. The system of claim 15, wherein the plurality of data fields includes any one of: a universally unique identifier (UUID), a mount point, a file system type, a list of options, a backup operation, a file system check order, and any combination thereof.

17. The system of claim 10, wherein the memory further includes instructions which when executed by the processing circuitry configure the system to:
- initiate inspection of the selected partition for a cybersecurity object.

* * * * *